(12) United States Patent
Lei et al.

(10) Patent No.: US 6,244,764 B1
(45) Date of Patent: Jun. 12, 2001

(54) METHOD FOR DATA MATRIX PRINT QUALITY VERIFICATION

(75) Inventors: Ming Lei, Walpole; Raymond Ackaouy, Quincy, both of MA (US)

(73) Assignee: Robotic Vision Systems, Inc., Canton, MA (US)

( * ) Notice: Subject to any disclaimer, the term of this patent is extended or adjusted under 35 U.S.C. 154(b) by 0 days.

(21) Appl. No.: 09/489,023

(22) Filed: Jan. 21, 2000

(51) Int. Cl.[7] .................................................. B41J 2/00
(52) U.S. Cl. ............................ 400/103; 400/104; 400/74
(58) Field of Search ............................... 400/62, 103, 74, 400/104; 235/462.07, 462.08

(56) References Cited

U.S. PATENT DOCUMENTS

| | | |
|---|---|---|
| 4,822,986 | 4/1989 | Guthmueller et al. . |
| 4,939,354 | 7/1990 | Priddy et al. . |
| 5,241,166 | 8/1993 | Chandler . |
| 5,276,315 | 1/1994 | Surka . |
| 5,304,786 * | 4/1994 | Pavlidis et al. ........................ 235/462 |
| 5,343,031 | 8/1994 | Yoshida . |
| 5,454,054 | 9/1995 | Iizuka . |
| 5,473,151 * | 12/1995 | Priddy et al. ......................... 235/494 |
| 5,627,358 | 5/1997 | Roustaei . |
| 5,698,833 | 12/1997 | Skinger . |
| 5,710,417 | 1/1998 | Joseph et al. . |
| 5,729,001 | 3/1998 | Spitz . |
| 5,739,518 | 4/1998 | Wang . |
| 5,773,810 | 6/1998 | Hussey et al. . |
| 5,798,513 | 8/1998 | Ackley . |
| 5,854,478 | 12/1998 | Liu et al. . |
| 5,949,052 * | 9/1999 | Longacre, Jr. et al. ......... 235/462.08 |
| 6,070,805 * | 6/2000 | Kaufman et al. .................... 235/494 |

* cited by examiner

*Primary Examiner*—John S. Hilten
*Assistant Examiner*—Charles H. Nolan, Jr.
(74) *Attorney, Agent, or Firm*—Hoffman Wasson & Gitler

(57) ABSTRACT

A method of verifying data matrix print quality utilizing center offset for dot peen or inkjet marks, and size offset for laser etched or printed marks. The method of the present invention builds on the AIM specification and provides additional measures to determine the quality of the data matrix marks. Center offset and size offset measurements are employed to determine the data matrix quality.

21 Claims, 4 Drawing Sheets

BROKEN BORDER

DATA STORAGE

ECC00   ECC50   ECC80   ECC100   ECC140   ECC200

QUIET ZONE

SOLID BORDER

METHOD FOR DATA MATRIX PRINT QUALITY VERIFICATION

BACKGROUND OF THE INVENTION

1. Field of the Invention

The present invention relates to a method for verifying data matrix print quality. More particularly, the present invention relates to a method of verifying the quality of two dimensional part marks on all types of direct part marking applications and label marking applications. The overall symbol grade, symbol contrast, print growth, axial non-uniformity, unused error correction, and other parameters relating to direct part marking are identified.

2. Description of the Prior Art

One and two dimensional part marks have achieved wide spread acceptance throughout a wide variety of industries. At most, systems and devices for reading such one and two dimensional symbols begin by determining the orientation of the markings before trying to read the symbol. Usually this is done by locating an outer reference bar(s) or a central symbol. Once the orientation of the marking is determined, the marking is read.

The term data matrix has been certified by AIM-USA and AIM-International as a fully public-domain symbology. AIM stands for Automatic Identification Manufacturers International, Inc. The data matrix is a unique machine readable symbol capable of storing a large amount of information within a small physical size. The data matrix symbol allows for two-dimensional encoding and decoding. Users are not constrained by the limitations of a printed symbol. Data matrix symbols are capable of carrying 25 to 100 times more information than the typical barcode. This range is directly related to the image quality the printer is capable of producing.

Data matrix codes have the following characteristics: both height and width are used to encode data, works with contrast as low as 20%, readable through 360° of rotation, designed to survive harsh industrial environments, codes can be marked on the surface of a part, without using a paper label, and several error correction schemes are available to ensure damage recovery.

No method or system has been developed for determining the quality of the part markings.

SUMMARY OF THE INVENTION

These and other deficiencies of the prior art are addressed by the present invention which is directed to a method for verifying data matrix print quality that can provide a high level of validation of two dimensional barcodes, and verify that the marks or labels have been properly applied and are readable.

The method is designed to run on a Windows based personal computer, and is compliant with the AIM Uniform Symbology Specification for Data Matrix Symbology. A camera 10, shown in FIGS. 1a and 1b, is employed to verify the data matrix symbol. The camera 10 is mounted on a camera mount 20, as shown in FIG. 2 to control the position of the camera 10.

The method measures symbol contrast, print growth, axial non-uniformity, unused error correction, and overall grade. In addition to these parameters, the cell placement accuracy, cell size uniformity, and overall symbol quality are also measured. The method may also provide other relevant information about the data matrix, such as polarity, symbol size, error correction level, image style, and encoded data string.

An object of the present invention is to provide a method of precisely measuring the quality of data matrix marks.

Another object of the present invention is to provide a method of determining the quality of dot peen or ink jet marks.

Yet another object of the present invention is to provide a method of determining the quality of laser etched or printed marks.

Still another object of the present invention is to provide a method of measuring the quality of data matrix marks utilizing center offset and size offset measurements.

BRIEF DESCRIPTION OF THE DRAWINGS

These and other attributes of the present invention will be described with respect to the following drawings in which.

DETAILED DESCRIPTION OF THE INVENTION

Figures 1A, 1B:
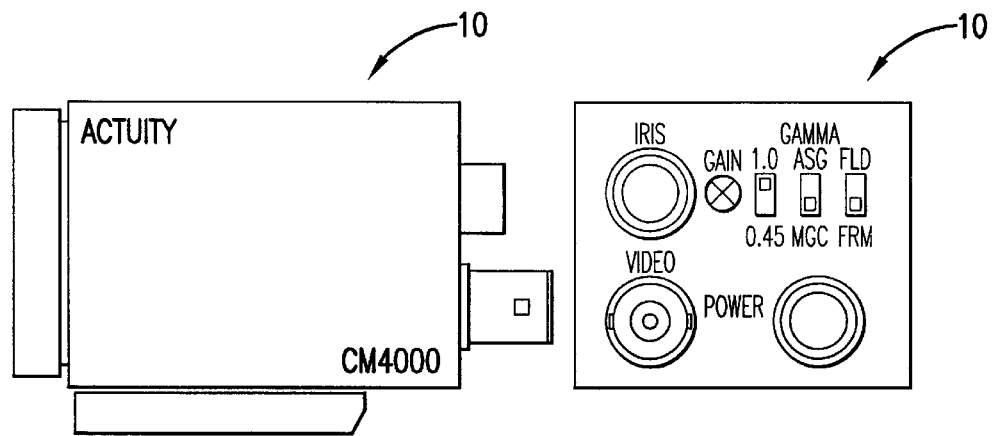
FIGS. 1a and 1b are a side and end view of a camera used in the method of the present invention, respectively.
Figure 2:
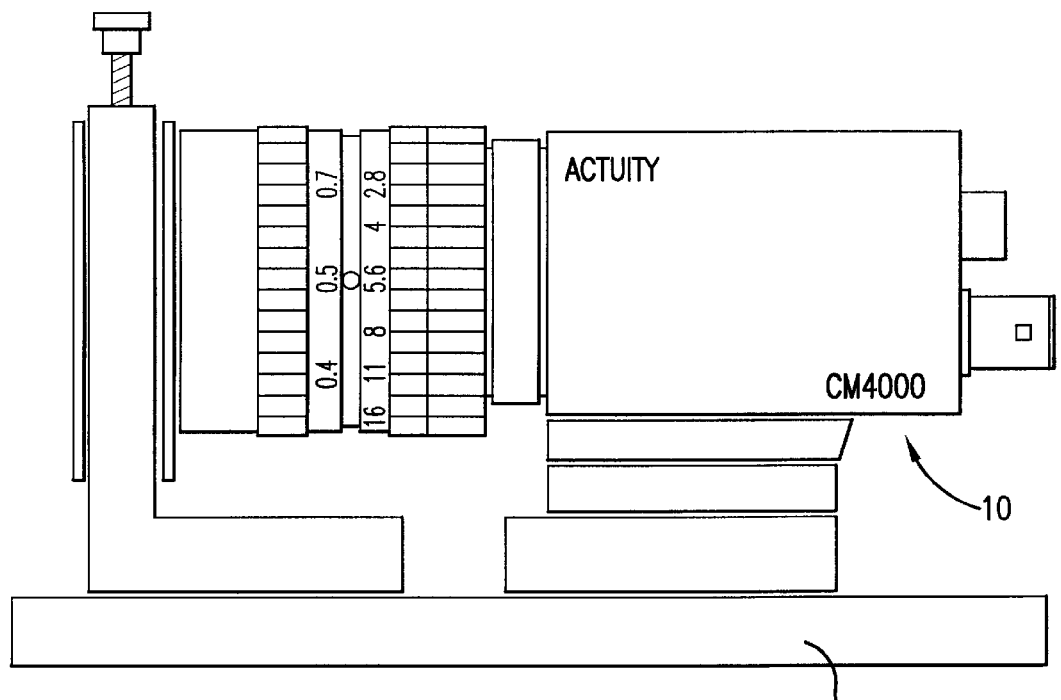
FIG. 2 is a representation of the camera shown in FIG. 1 attached to a camera mount.
Figure 4:
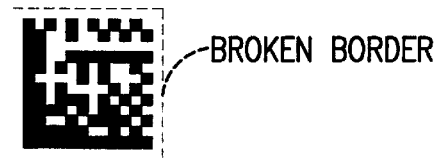
FIG. 4 is an illustration of a data matrix code having two broken borders.
Figure 5:
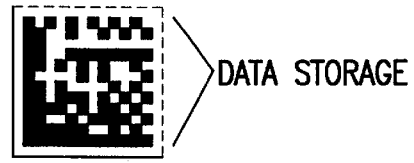
FIG. 5 is an illustration of a data matrix code identifying the data storage area.
Figure 7A:
FIGS. 7a–7f are examples of different data matrix codes.
Figure 7B:
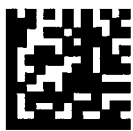
Figure 7C:
Figure 7D:
Figure 7E:
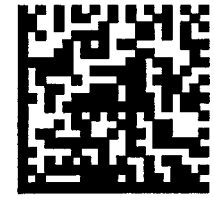
Figure 7F:

The method of the present invention uses the solid border of the data matrix symbol to calculate the rotation of the data matrix symbol, and the broken border, as shown in FIG. 4, to identify the number of rows and columns in a symbol. The data storage area, illustrated in FIG. 5, contains the binary information that was encoded during construction of the data matrix.

A data matrix is a unique machine-readable symbol capable of storing a large amount of information within a small physical area. Examples of data matrix codes, ECC00, ECC50, ECC80, ECC100, ECC140, and ECC200, are shown in FIGS. 7a–7f, respectively. The data matrix symbology permits two-dimensional encoding and decoding. Data matrix symbols may have an output size ranging from 0.001 square inch to 14 square inches, regardless of the amount of information encoded. Up to 3116 numeric characters or 2335 alphanumeric characters may be encoded in a single symbol. Many supported international languages may be encoded and read with data matrix symbol, and they may be easily integrated with existing computer systems.

A data matrix symbol can carry 25 to 100 times more information than the typical barcode. This range is directly related to the image quality that the symbol printer is capable of producing.

Data matrix symbols have numerous advantages such as utilizing both height and width to encode data. The data matrix symbols work with contrast as low as 20%, and are readable through 360° of rotation. The data matrix symbols can survive harsh industrial environments. The data matrix codes can be 30 marked directly on the product, thereby eliminating the need for a paper label. Several error correction schemes are available to ensure damage recovery. Finally, advanced processing may be used to achieve higher read rates of cluttered and/or damaged symbols.

The AIM Specification is designed for ECC200, which is code word-based. If any cell within the code word is misidentified, the code word is subsequently affected by that bit and thus requires error correction. Since it is the code word that matters in the error correction algorithm, one single bit can cause the same amount of damage as eight wrong bits in the same code word. The method of the present invention is designed to cover both ECC200 and non-ECC200 data matrices. As a result, the number of wrong cells or bits (not code words) is displayed.

Error correction provides safeguards and additional capabilities for handling poorly printed or damaged symbols. Error Correction Codes (ECC) are selected by the user when encoding a data matrix symbol.

Figure 6:
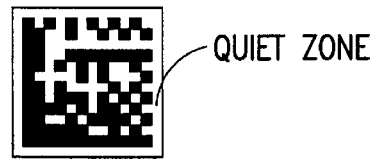
FIG. 6 is an illustration of a data matrix code and quiet zone.

Each data matrix symbol consists of data regions, as shown in FIG. 6, which contain nominally square modules, set out in a regular array. In larger ECC 200 symbols, data regions are separated by alignment patterns. The data region is surrounded by a finder pattern, and as a result is surrounded on all four sides by a quiet zone border.

The finder pattern is a perimeter to the data region and is one module wide. Two adjacent sides (left and lower sides) forming the L-shaped boundary, are solid dark lines. These sides primarily determine physical size, orientation and symbol distortion. The two opposite sides are made up of alternating dark and light modules. These are used primarily to define the cell structure of the symbol, but can also assist in determining physical size and distortion.

Regarding symbol sizes and capacities, the ECC 000–140 symbols consist of an odd number of rows and columns. Symbols are square with sizes from 9×9 to 49×49 (modules) not including quiet zones. These symbols can be recognized by the upper right corner module being dark. For an image of reversed polarity, it would be light. Complete attributes for ECC000–140 symbols are provided in the *AIM International Technical Specification, International Symbology Specification-Data Matrix* (1996).

ECC 200 symbols consist of an even number of rows and columns. Some symbols may be square with sizes from 10×10 to 144×144 not including the quiet zone. Other symbols may be rectangular with sizes of 8×8 to 16×48 not including the quiet zone. All ECC 200 symbols can be recognized. All ECC200 symbols can be recognized by the upper right corner being light. For an image of reversed polarity it will be dark. Complete attributes for ECC200 symbols are provided in the *AIM International Technical Specification, International Symbology Specification-Data Matrix* (1996).

The method measures symbol contrast, print growth, axial non-uniformity, unused error correction, and overall grade. In addition to these parameters, the cell placement accuracy, cell size uniformity, and overall symbol quality are also measured. The method may also provide other relevant information about the data matrix, such as polarity, symbol size, error correction level, image style, and encoded data string.

The symbol contrast refers to the difference in the reflectance between the light and dark cells of the symbol. It is measured according to the AIM specification. The symbol contrast grade is as follows:

A for 70% +contrast;
B for 55% +contrast;
C for 40% +contrast;
D for 20% +contrast;
F for less than 20% +contrast.

The axial non-uniformity measures the difference in average spacing between the center of adjacent cells in the horizontal axis versus that of the vertical axis. A square data matrix with the same number of rows as columns typically resembles a rectangular matrix when axial non-uniformity is significant as measured per the AIM specification. The grading is as follows:

A when the axial non-uniformity is $\leq 0.06$;
B when the axial non-uniformity is $\leq 0.08$;
C when the axial non-uniformity is $\leq 0.10$;
D when the axial non-uniformity is $\leq 0.12$;
F when the axial non-uniformity is>0.12.

The print growth percentage measures the data matrix cells by the degree of over-printing or under-printing, Ideally, the dark cell and light cell should be the same size, which is the nominal cell size.

The print growth yields a positive value for an over-printed data matrix and a negative value for an under-printed data matrix. This print growth is based on the cells along the two timing borders for AIM measurement. The present method uses all of the cells in the data matrix, and its print growth measurement coincides with the AIM measurement when the cells on the timing border have the same print growth as the remainder of the matrix cells. The method also represents the print growth score as 3/20th of the AIM score, which indicates the percentage value the cells grow or shrink from their nominal cell size. The AIM grade for print growth converted to present invention is as follows:

A when the print growth percentage $\leq \pm 7.5\%$
B when the print growth percentage $\leq \pm 10.5\%$
C when the print growth percentage $\leq \pm 12.75\%$
D when the print growth percentage $\leq \pm 15\%$
F when the print growth percentage $> \pm 15\%$.

The unused error correction indicates how much of the error correction capability of the ECC 200 symbol is required in order to decode the symbol. The more that the error correction is used, the poorer the print quality of the symbol. The grading is as follows:

A when the unused error correction $\geq 0.62$
B when the unused error correction $\geq 0.50$
C when the unused error correction $\geq 0.37$
D when the unused error correction $\geq 0.25$
F when the unused error correction <0.25.

The overall grade is defined by the AIM specification.

This grade selects the overall lowest grade among symbol contrast, axial non-uniformity, print growth percentage, and unused error correction.

Figure 3:
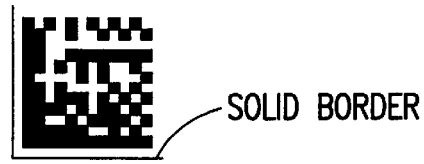
FIG. 3 is an illustration of a data matrix code having two solid borders.
Figure 8:
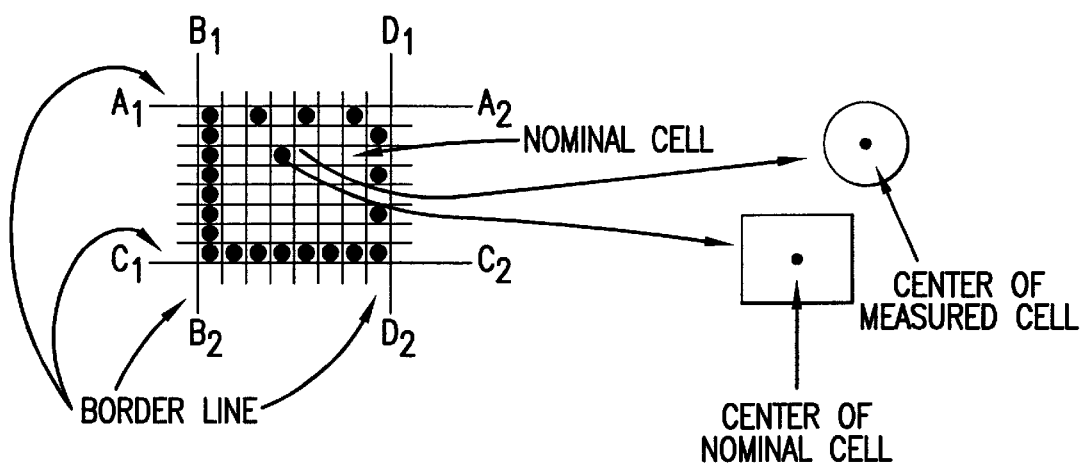
FIG. 8 is an illustration of a typical dot peen mark.

The center offset error measures the cell placement uniformity. The center offset error measurement is based upon active cells of the data matrix. The active or on cells consist of cells with the same polarity as cells on the two solid borders, as shown in FIG. 3. Inactive or off cells are those cells that are not active cells. In a dark on light data matrix, dark cells are active cells. In a light on dark data matrix, light cells are active cells. In order to measure the center offset error, an ideal data matrix grid, with equal spacing between cells in both axes, is first derived based on the quadrilateral formed by the four border lines of the actual data matrix symbol being measured. Each border line is determined by fitting a line to the outermost edge points of the cells on the solid or broken borders. In FIG. 8, lines $A_1A_2, B_1B_2, C_1C_2$, and $D_1D_2$ are the four border lines. The four corners of the matrix are the four points intersected by the four border lines. The nominal cells are formed by equally dividing the matrix area with the numbers of rows and columns. The coordinates of the center of each nominal cell are represented by $(X_i^N, Y_i^N)$. The center of each active cell, represented by $(X_i^M, Y_i^M)$, is also measured from the image.

The center offset measures whether the cells are placed in the ideal location with the assumption that the cells are evenly spaced. The center offset is defined as:

$$\text{center offset} = \frac{\sum_{i \in \{\text{active cells}\}} \sqrt{(X_i^N - X_i^M)^2 + (Y_i^N - Y_i^M)^2}}{\text{Number of active cells} \times d}$$

The nominal cell size d can be chosen as the width (or height) of the nominal cells. For each active cell with center coordinates $((X_i^M, Y_i^M)$, the coordinates $(X_i^N, Y_i^N)$ represent the center of the nominal cell that has the shortest distance from the center of the active cell.

The active cells contributing to the center offset score can be graphically displayed from the following three categories:

The active cell whose distance from its nearest nominal cell is within 15% of the nominal cell size;

The active cell whose distance from its nearest nominal cell is between 15% and 30% of the nominal cell size; and The active cell whose distance from its nearest nominal cell is above 30% of the nominal cell size.

The size offset error measures the cell size uniformity based on all active cells. The cell size (or area) of all active cells are measured and the average size (or area) of the active cells is computed. The size offset error is equivalent to the standard deviation of the various cell sizes from the average size. The size offset error measures whether each cell is similar to the average cell size. The size offset error is significant when there are active cells with sizes significantly greater or smaller than the average. The average cell size is related to the print growth. When the average cell size is the same as the nominal cell size, the symbol has no print growth. When the average cell size is greater than the nominal cell size, the symbol has positive print growth. When the average cell size is smaller than the nominal cell size, the symbol has negative print growth. Some marking techniques (for example, dot peen) may never achieve the perfect nominal cell size with no print growth, but the marked symbol is considered good as long as all the cells are of uniform size.

The overall matching is computed as the normalized correlation of the symbol with the idealized data matrix template. The idealized data matrix template is generated to have the same height, width, number of rows, number of columns, and polarity (dark on light or light on dark) as the data matrix being measured. To generate the active cells in the template, the data matrix being measured needs to be decoded and its error correction scheme identified. This information is then used to recreate the idealized template. The idealized template has two values 0 and 1, with 0 representing dark cells and 1 representing light cells. To make the overall matching score as high as possible, the shape of the cells in the idealized template can be set to square, rectangular, round or other shapes to resemble the shape of the cell in the mark to be measured. If an absolute overall match score is desired regardless of the marking techniques used, then a rectangular cell with nominal cell width and height should be used. The overall matching score reflects the data matrix's overall quality.

The present invention builds on the AIM specification and provides additional measures to determine the quality of the data matrix marks. Center offset and size offset measurements are employed to determine the data matrix quality in terms of cell placement accuracy and cell size consistency. To compute the center offset and size offset values, the edges of each of the individual data matrix cells needs to be found, and thereby derive the center locations and areas of the cells. The steps by which the image is processed and registered can be performed in any one of the many conventional methods known in the field. For example, the data matrix can be binarized using a single threshold determined based on histogramming the data matrix, or using various adaptive thresholding techniques. The edges can be found from the binary image. The edges can also be found directly from the gray scale image using standard edge detection techniques such as Sobel or Gradient method.

Figure 9:
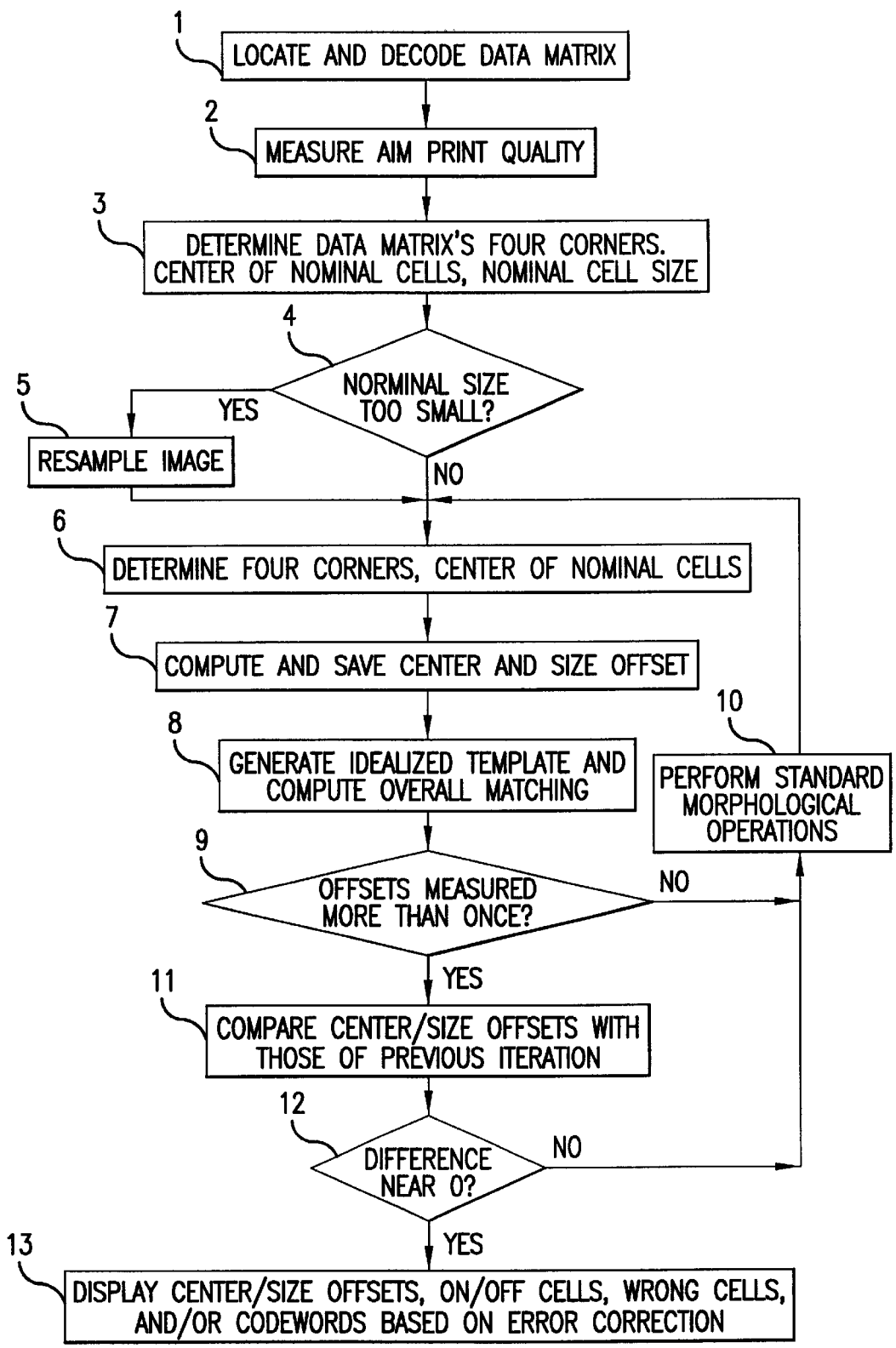
FIG. 9 is a flowchart of the method of the present invention.

Referring to the flow chart shown in FIG. 9, in operation, the data matrix mark is located and decoded in step 1. In step 2, the print quality of the data matrix is measured using the AIM Specification based upon symbol contrast, print growth, axial non-uniformity, unused error correction, and overall grade. The present invention then measures the additional aspects that affect print quality in the following steps.

In step 3, the data matrix's four corners, center coordinates of nominal cells, and nominal cell size are computed. The nominal cell size is checked in step 4. If the nominal cell size is not too small (for example, at least 5 pixels in width), then the image is directly used in step 6. Otherwise, the data matrix image is re-sampled in step 5 to increase its resolution. The re-sampled image will then be used in step 6. The method then uses the following iterative process in order to obtain more precise and repeatable measurement scores. In step 6, the four corners of the data matrix and the center coordinates of the nominal cells are computed. The center offset and size offset are computed in step 7. In step 8, the idealized template is generated and the overall matching computed. In step 9, the method checks if the center offset and size offset have been computed more than once. If this is not the case, the method will perform standard morphological operations in step 10 for enhancing the image quality to achieve precise measurements. The enhanced image will be used in step 6 for another iteration of the center offset and size offset measurements. The morphological operations include erosion, dilation, open close, top hat, well, and max+min. Certain operations are only intended for enhancing certain measurements. For example, depending on the polarity of the data matrix, erosion or dilation may fill some voids in data matrix cells or increase/decrease cell feature size for better cell placement uniformity measurement. Open or close operation will remove noise spots without affecting the cell size, thus yield better cell size uniformity measurement. In step 9, if the center offset error and size offset error have been measured more than once, then the newly obtained center offset and size offset are compared with those obtained in the previous iteration to obtain the differences for both offsets in step 11. In step 12, if any of the difference is significant, then step 10 is performed and the enhanced image is used in a new iteration starting with step 6. If neither of the differences is significant in step 12, then the iterative process stops. The center offset, size offset, on/off cells, wrong cells and/or codewords based on used error correction are displayed in step 13.

The center offset may likely indicate any cell placement problem for data matrix symbols generated from inkjet printing or dot-peen technique. For example, inkjet marks may not display any print growth problem. However, these marks tend to have erroneous cell locations. Using the center offset alone will help reject marks with cell center misplacement problems.

The size offset can be used to indicate whether the cells are produced with an even size within the same data matrix. Due to parameter changes in the marking process, such as pressure change in dot-peen or laser power variation in laser etching, it is possible to produce a data matrix symbol with inconsistent cells. In some extreme cases, some cells may barely be visible while others may be severely overprinted.

Having described several embodiments of the method of verifying data matrix print quality in accordance with the present invention, it is believed that other modifications, variations and changes will be suggested to those skilled in the art in view of the description set forth above. It is therefor to be understood that all such variations, modifications and changes are believed to fall within the scope of the invention as defined in the appended claims.

What is claimed is:

1. A method for verifying data matrix print quality comprising the steps of:
   locating a data matrix mark;
   decoding said data matrix mark;
   measuring a print quality of said data matrix mark;
   measuring additional aspects that affect print quality, said additional aspects comprising at least one of the following:
   cell placement uniformity; and
   cell size uniformity;
   measuring an overall matching score;
   displaying at least one of a center offset, size offset, on/off cells, wrong cells, and/or codewords based on the error correction;
   performing standard morphological operations for enhancing the image quality to achieve more robust measurement; and
   resampling an image of said data matrix to achieve better measurements.

2. A method for verifying data matrix print quality, as recited in claim 1, wherein said step of measuring a print quality of said data matrix mark is performed using the AIM Specification.

3. A method for verifying data matrix print quality, as recited in claim 2, wherein said step of measuring a print quality of said data matrix mark is based upon symbol contrast, print growth, axial non-uniformity, unused error correction, and overall grade.

4. A method for verifying data matrix print quality, as recited in claim 1, wherein said cell placement uniformity measures whether cells of said data matrix are placed in ideal locations based upon an assumption that said cells are evenly placed.

5. A method for verifying data matrix print quality, as recited in claim 1, wherein said cell size uniformity measures whether each cell of said data matrix is similar to an average cell size.

6. A method for verifying data matrix print quality, as recited in claim 5, wherein said average cell size is related to print growth, so that when said average cell size is larger than an ideal cell size, said data matrix has positive print growth, when said average cell size is smaller than said ideal cell size, said data matrix has negative print growth.

7. A method for verifying data matrix print quality, as recited in claim 5, wherein said data matrix is considered good when said cells are of uniform size.

8. A method for verifying data matrix print quality, as recited in claim 1, wherein said overall matching score is based upon an outline of said data matrix.

9. A method for verifying data matrix print quality, as recited in claim 8, wherein a matrix template is provided based upon each cell having uniform size and placement in an ideal location, and said overall matching score is then normalized between said template and said matrix.

10. A method for verifying data matrix print quality, as recited in claim 1, wherein said step of performing standard morphological operations comprises erosion, dilation, open, close, top hat, well, and max+min.

11. A method for verifying data matrix print quality comprising the steps of:
    deriving an ideal data matrix grid, with equal spacing between cells of said data matrix in both axes based on said data matrix symbol being measured;
    determining a nominal cell size;
    measuring a center of each active cell of said data matrix and an ideal center indicated by said ideal data matrix grid; and
    measuring a center offset error which is a measure of cell placement uniformity of said data matrix, based upon active cells of said data matrix.

12. A method for verifying data matrix print quality, as recited in claim 11, further comprising the step of displaying a number of cells which derive a center offset in three following categories:
    a first total ranging between 0 and 15% of said nominal cell size;
    a second total ranging between 15% and 30% of said nominal cell size; and
    a third total greater than 30% of said nominal cell size.

13. A method for verifying data matrix print quality, comprising the steps of:
    measuring a size offset error of cell size uniformity based on all active cells of said data matrix;
    measuring cell sizes of all active cells of said data matrix;
    computing an average size of said active cells of said data matrix; and
    determining said size offset error as equivalent to a standard deviation of various cell sizes from average cell size.

14. A method for verifying data matrix print quality, as recited in claim 11, wherein said center offset indicates cell placement problem for data matrix symbols generated from inkjet printing or dot-peen technique, wherein said center offset helps reject marks with cell center misplacement problems.

15. A method for verifying data matrix print quality, as recited in claim 13, wherein said size offset indicates whether said cells of said data matrix are produced with an even size within a single data matrix.

16. A method for verifying data matrix print quality, as recited in claim 1, wherein said method is performed on a Windows based personal computer.

17. A method for verifying data matrix print quality, as recited in claim 11, wherein said method is performed on a Windows based personal computer.

18. A method for verifying data matrix print quality, as recited in claim 13, wherein said method is performed on a Windows based personal computer.

19. A method for verifying data matrix print quality comprising the steps of:
    locating a data matrix mark;

decoding said data matrix mark;

measuring a print quality of said data matrix mark using the AIM Specification based upon symbol contrast, print growth, axial non-uniformity, error correction scheme used, and overall grade;

measuring additional aspects that affect print quality, said additional aspects comprising at least one of the following:
cell placement uniformity; and
cell size uniformity;

measuring an overall matching score;

displaying a center offset, size offset, on/off cells, wrong cells, and/or codewords based on the error correction;

performing standard morphological operations for enhancing the image quality to achieve more robust measurement, including at least one of the following: erosion, dilation, open, close, top hat, well, and max+min; and resampling an image of said data matrix to achieve better measurements of at least one of the following, wherein said cell placement uniformity measures whether cells of said data matrix are placed in deal locations with based upon an assumption that said cells are evenly placed, wherein said cell size uniformity measures whether each cell of said data matrix is similar to an average cell size, wherein said average cell size is related to print growth, so that when said average cell size is larger than an ideal cell size, said data matrix has positive print growth, when said average cell size is smaller than said ideal cell size, said data matrix has negative print growth, wherein said data matrix is considered good when said cells are of uniform size, wherein said overall matching score is based upon an outline of said data matrix, and wherein a matrix template is provided based upon each cell having uniform size and placement in an ideal location, and said overall matching score is then normalized between said template and said matrix.

20. A method for verifying data matrix print quality comprising the steps of:

deriving an ideal data matrix grid, with equal spacing between cells of said data matrix in both axes based on said data matrix symbol being measured;

determining a nominal cell size;

measuring a center of each active cell of said data matrix and an ideal center indicated by said ideal data matrix grid; and measuring a center offset error which is a measure of cell placement uniformity of said data matrix, based upon active cells of said data matrix;

displaying a number of cells which derive a center offset in three following categories:
a first total ranging approximately between 0 and 15% of said nominal cell size;
a second total ranging approximately between 15% and 30% of said nominal cell size; and
a third total greater than approximately 30% of said nominal cell size.

measuring a size offset error of cell size uniformity based on all active cells of said data matrix;

measuring cell sizes of all active cells of said data matrix;

computing an average size of said active cells of said data matrix; and determining said size offset error as equivalent to a standard deviation of various cell sizes from average cell size, wherein said center offset indicates cell placement problem for data matrix symbols generated from inkjet printing or dot-peen technique, wherein said center offset helps reject marks with cell center misplacement problems, and wherein said size offset indicates whether said cells of said data matrix are produced with an even size within a single data matrix.

21. A method for verifying data matrix print quality comprising the steps of:

locating a data matrix mark;

decoding said data matrix mark;

determining four corners, center of nominal cells and nominal cell size for said data matrix;

comparing said nominal cell size with a reference size;

re-sampling said nominal cell size when said nominal cell size is less than said reference size;

determining four corners and center of said nominal cells;

deriving and storing center offset and size offset;

generating an idealized template and computing an overall match;

determining if center offset and size offset have been measured more than once;

performing standard morphological operations when said center offset and size offset have been measured only once, and repeating said step of determining four corners and center of said nominal cells;

comparing center offset and size offset with value of previous iteration when said step of determining if center offset and size offset have been measured more than once is positive; and displaying at least one of said center offset, size offset, on/off cells, wrong cells, and/or codewords based on the error correction, when a difference between said center offset and size offset of two consecutive iterations is near zero; and performing standard morphological operations and returning to said step of determining four corners and center of said nominal cells when said difference between said center offset and size offset of said two consecutive iterations is not near zero.

* * * * *